US005780825A

United States Patent [19]

[11] Patent Number: 5,780,825
[45] Date of Patent: Jul. 14, 1998

Sato et al.

[54] AUTOMATIC TELLER MACHINE INCLUDING A HALT REQUESTING MECHANISM IN A DURSS PERIOD

[75] Inventors: Ryoko Sato, Ibaraki-ken; Masao Okayama, Ryugasaki; Yoshio Fukudome; Masuo Furutono, both of Ibaraki-ken, all of Japan

[73] Assignee: Hitachi, Ltd., Tokyo, Japan

[21] Appl. No.: 753,760

[22] Filed: Nov. 29, 1996

[30] Foreign Application Priority Data

Nov. 29, 1995 [JP] Japan .................................. 7-310232

[51] Int. Cl.[6] .................................................... G06F 17/60

[52] U.S. Cl. .......................... 235/379; 235/380; 235/382; 902/6; 902/8; 902/27; 902/30

[58] Field of Search ...................................... 235/379, 375, 235/380, 382, 382.5; 902/1, 6, 8, 20, 21, 25, 26, 27, 30, 31, 33, 35

[56] References Cited

U.S. PATENT DOCUMENTS

| | | | |
|---|---|---|---|
| 4,417,527 | 11/1983 | Williams et al. | 902/33 X |
| 4,557,352 | 12/1985 | Tschappat, Jr. | 902/33 X |
| 4,649,832 | 3/1987 | Hain et al. | 902/33 X |
| 4,804,830 | 2/1989 | Miyagisma et al. | 235/379 |
| 4,864,108 | 9/1989 | Hamada | 325/379 |
| 4,991,008 | 2/1991 | Nama | 235/379 X |
| 5,337,358 | 8/1994 | Axelrod et al. | 235/380 X |
| 5,354,974 | 10/1994 | Eisenberg | 235/379 |
| 5,548,632 | 8/1996 | Walsh et al. | 379/88 |

*Primary Examiner*—Donald T. Hajec
*Assistant Examiner*—Michael G. Lee
*Attorney, Agent, or Firm*—Antonelli, Terry, Stout & Kraus, LLP

[57] ABSTRACT

An automatic teller machine having an operation guide, an input unit, a transaction medium handling unit a halt requesting unit for requesting suspension of a transaction, a transaction recording unit for recording transaction information including information entered up to the point when the transaction suspension was requested and also for recording a transaction processing stage arrived at when the transaction suspension was requested, and an unreleased medium storing unit. When a transaction suspension is requested, a transaction resumption procedure is guided by the operation guide and, based on this transaction resumption procedure, the suspended transaction processing is resumed from the transaction processing stage recorded in the transaction recording unit by using the transaction information recorded in the transaction recording unit to release the transaction media stored in the unreleased medium storing unit.

15 Claims, 7 Drawing Sheets

AUTOMATIC TELLER MACHINE INCLUDING A HALT REQUESTING MECHANISM IN A DURSS PERIOD

BACKGROUND OF THE INVENTION

The present invention relates to an automatic teller machine and more particularly to an automatic teller machine that properly protects user's media and information against theft while in transaction.

A drive-through type automatic teller machine has been proposed, in which a user arriving at the machine in his or her automobile can conduct transactions while staying in the car. The drive-through type automatic teller machine can save the user a trouble of maneuvering his car to park it in a limited space of parking lot, getting out and into the car, and walking between the parking lot and the transaction machine. This is particularly advantageous in terms of reduced labor for physically handicapped persons who have difficulty getting into or out of the car and also for users driving with their children because they are free from a trouble of taking their babies out of the car and from apprehensions that will arise when leaving the children in the car. The drive-through type automatic teller machine also eliminates the need for the user to maneuver the car for parking and walk between the parking lot and the machine. This in turn reduces the time each car occupies the parking lot, contributing to effective use of the parking lot. Japan Patent Laid-Open No. 125699/1989 discloses one such system, which allows only those automobiles that are already registered to enter into a transaction position for security. This technology, however, does not refer to a means for preventing unauthorized persons from walking into the transaction area.

Not only is this type of automatic teller machine unsafe because unauthorized persons can make easy access to it but it has other security problem. That is, when the user performs transactions while staying in a car the user usually parks his car with the driver's seat side brought close to the machine for easy operation, so that the car door cannot be easily opened. If a rogue approaches the automatic teller machine intent on stealing transaction media such as transaction cards, bankbooks or cash as they are dispensed from the machine, it is difficult for the user to immediately get out of the car to stop him. If the operation screen of the machine is set in a longitudinal direction to face the front of the car so that it can easily be seen from inside the car, unauthorized persons present nearby can easily steal transaction information.

SUMMARY OF THE INVENTION

The conventional outdoor type automatic teller machines have a problem that it lacks an effective measure against the possibility of a third person approaching the machine during transaction and stealing transaction media and transaction information.

An object of this invention is to provide an outdoor type automatic teller machine which offers security against an approaching third person and ensures safe transactions.

The automatic teller machine of this invention comprises: a transaction medium handling means for handling transaction media; and a halt requesting means for requesting suspension of processing of the transaction media; wherein release of the transaction media is suspended by the halt requesting means. The automatic teller machine preferably comprises: an input means for entering transaction information; a transaction recording means for recording the transaction information entered from the input means and a current transaction processing stage when a transaction suspension is requested by the halt requesting means; and an unreleased medium storing means for storing unreleased transaction media when the suspension of transaction is requested.

More preferably, the automatic teller machine further comprises an operation guide means for guiding a procedure of resuming the suspended transaction when suspension of the transaction is requested by the halt requesting means, wherein the transaction media are at least one of cash, a bankbook and a card, and, when suspension of the transaction is requested by the halt requesting means, the suspended transaction processing is resumed, according to the resumption procedure, from the transaction processing stage recorded in the transaction recording means by using the transaction information recorded in the transaction recording means to release the transaction media stored in the unreleased medium storage means.

Further, the automatic teller machine preferably comprises a display means for displaying transaction information, wherein, when suspension of a transaction is requested by the halt requesting means, the transaction information displayed on the display means is erased.

Further, the automatic teller machine preferably comprises an image capturing means for capturing image of surrounding situation and a surrounding situation display means for displaying to a user images of the surrounding situation captured by the image capturing means.

Further, the automatic teller machine preferably comprises a security system having an anomaly detecting means for detecting an approaching mobile object other than a user engaged in transaction, wherein when the anomaly detecting means detects an mobile object, the security system issues an alarm to the user.

Further, the automatic teller machine preferably comprises a security system including: fences or walls enclosing an automobile of a user and adapted to prevent a third person from entering the enclosed space; an entrance and an exit provided to parts of the fences or walls to allow the passage of automobiles; and an opening/closing means for controlling doors at the entrance and exit so that only one automobile is admitted into the enclosed space.

Alternatively, the automatic teller machine preferably comprises an operation guide means for guiding a transaction resumption procedure when suspension of a transaction is requested by the halt requesting means, wherein, based on the transaction resumption procedure, the suspended transaction processing is resumed.

Further, the automatic teller machine preferably comprises: an operation guide means for guiding operations; a transaction medium handling means for handling transaction media; a halt requesting means for requesting suspension of a transaction during a period from the start to the end of the transaction; a transaction recording means for recording a transaction processing stage arrived at when suspension of the transaction was requested; and an unreleased medium storing means for storing unreleased media when the transaction suspension is requested; wherein the operation guide means guides a procedure of resuming the suspended transaction to release the transaction media stored in the unreleased medium storing means.

Further, the automatic teller machine preferably comprises: an input means for entering information necessary for a transaction; a transaction medium handling means for handling transaction media; and a release requesting means for requesting release of the transaction media; wherein after the release of the transaction media is requested by the release requesting means, the associated transaction media are released.

Further, the automatic teller machine preferably comprises: a transaction recording means for recording transaction information entered by the input means and a transaction processing stage; and an unreleased medium storing means for storing unreleased transaction media until the release of the media is requested by the release requesting means.

Further, the automatic teller machine preferably comprises: the release requesting means for requesting, from outside, the release of transaction media before the transaction media are released; a transaction recording means for recording transaction information including information entered by the input means up to the release of the transaction media; and an unreleased medium storing means for storing unreleased transaction media; wherein the transaçtion media are at least one of cash, a bankbook and a card, and, when the release of the transaction media is requested by the release requesting means, the transaction media stored in the unreleased medium storing means are released.

Further, the automatic teller machine preferably comprises: an image capturing means for capturing image of surrounding situation and a surrounding situation display means for displaying to a user images of the surrounding situation captured by the image capturing means.

Further, the automatic teller machine preferably comprises: a security system having an anomaly detecting means for detecting an approaching mobile object other than a user engaged in transaction, wherein when the anomaly detecting means detects an mobile object, the security system issues an alarm to the user.

Further, the automatic teller machine preferably comprises: a security system including: fences or walls enclosing an automobile of a user and adapted to prevent a third person from entering the enclosed space; an entrance and an exit provided to parts of the fences or walls to allow the passage of automobiles; and an opening/closing means for controlling doors at the entrance and exit so that only one automobile is admitted into the enclosed space.

With this invention, when the transaction medium handling means finishes processing the transaction media such as a transaction card, a bankbook and cash, it releases these transaction media. If, before the transaction media are issued, the user notices an approaching third person and decides it is not safe to retrieve the media and requests that the transaction be suspended by the halt requesting means, the machine suspends the release of the unreleased transaction media. Thus, the user can avoid having to pick up the important transaction media such as cash in the presence of a third person. The suspended transaction can be resumed later to have the machine dispense the unreleased transaction media. If the transaction suspension is requested while information necessary for the transaction is entered, the entered information is recorded by the transaction recording means, so that when the transaction resumption procedure is taken, there is no need for the user to reenter the information that was entered before the transaction suspension and the user needs only to enter information not yet entered. Further, because the input information on the display is erased when the transaction suspension is requested, the transaction information can be protected against being stolen by a third person.

DESCRIPTIONS OF THE PREFERRED EMBODIMENTS

Embodiments of this invention will be described by referring to the accompanying drawings.

Figure 1:
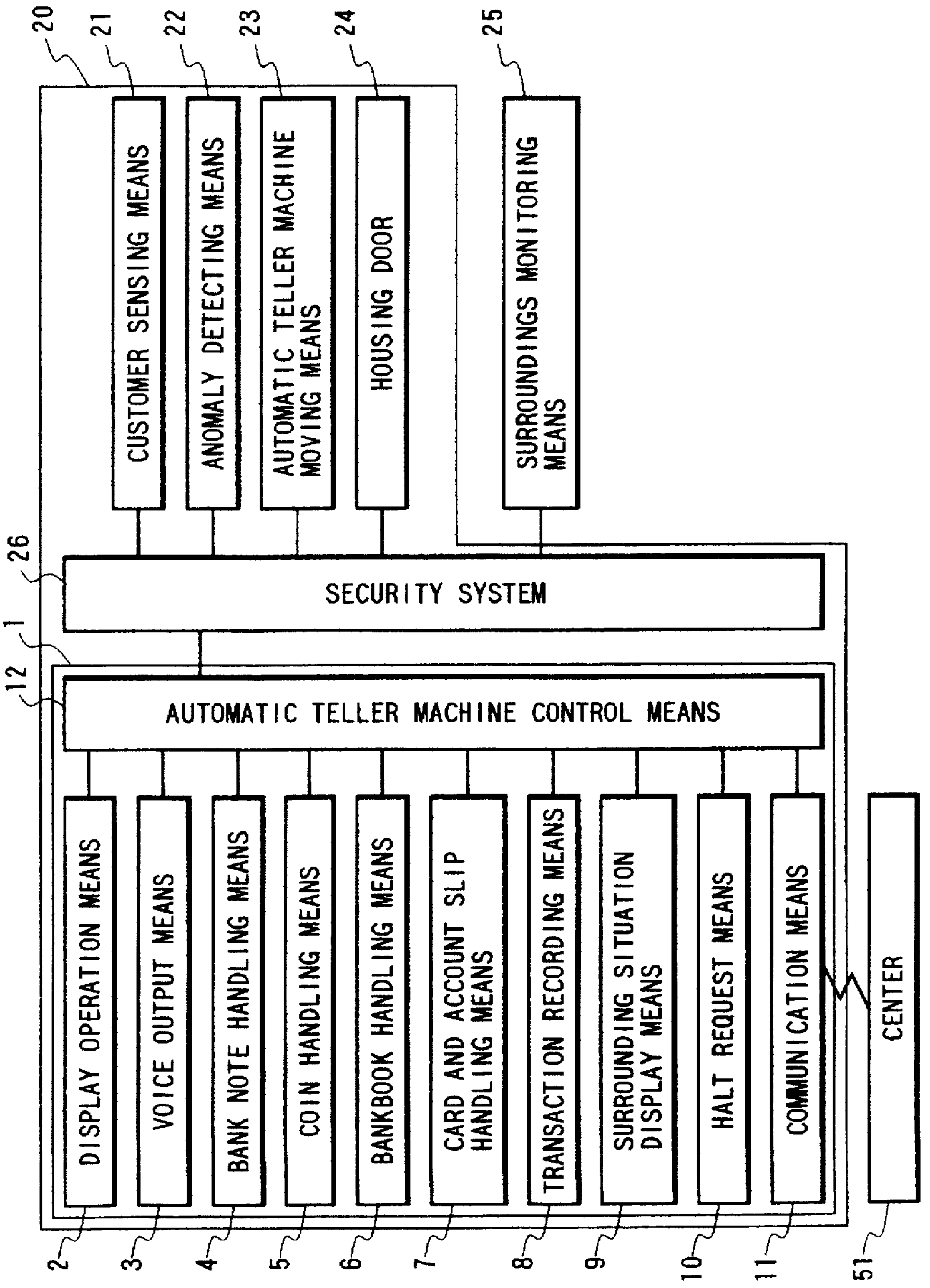
FIG. 1 is a block diagram of one embodiment of this invention.
Figure 2:
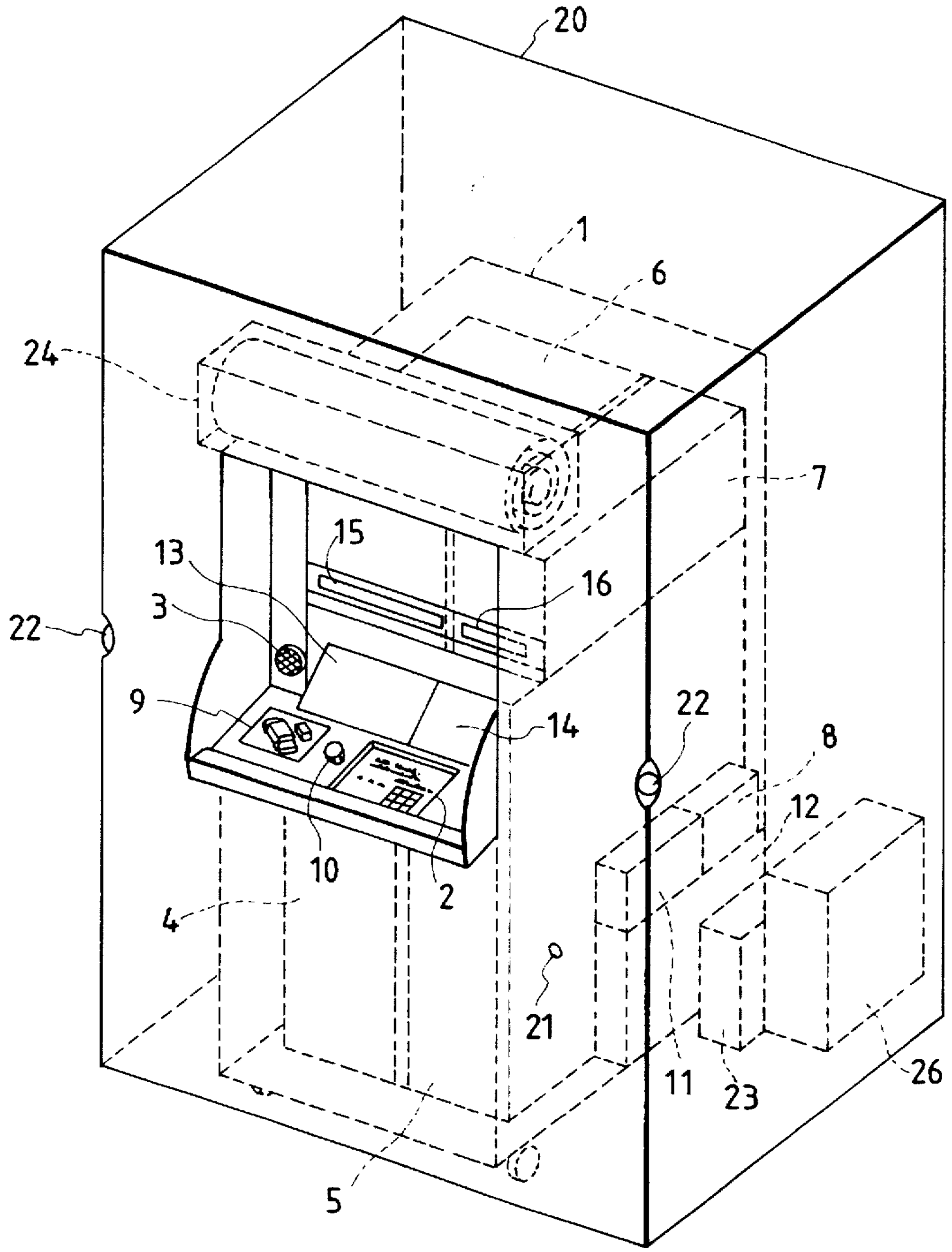
FIG. 2 is a schematic perspective view showing a configuration of the embodiment of FIG. 1.
Figure 3:
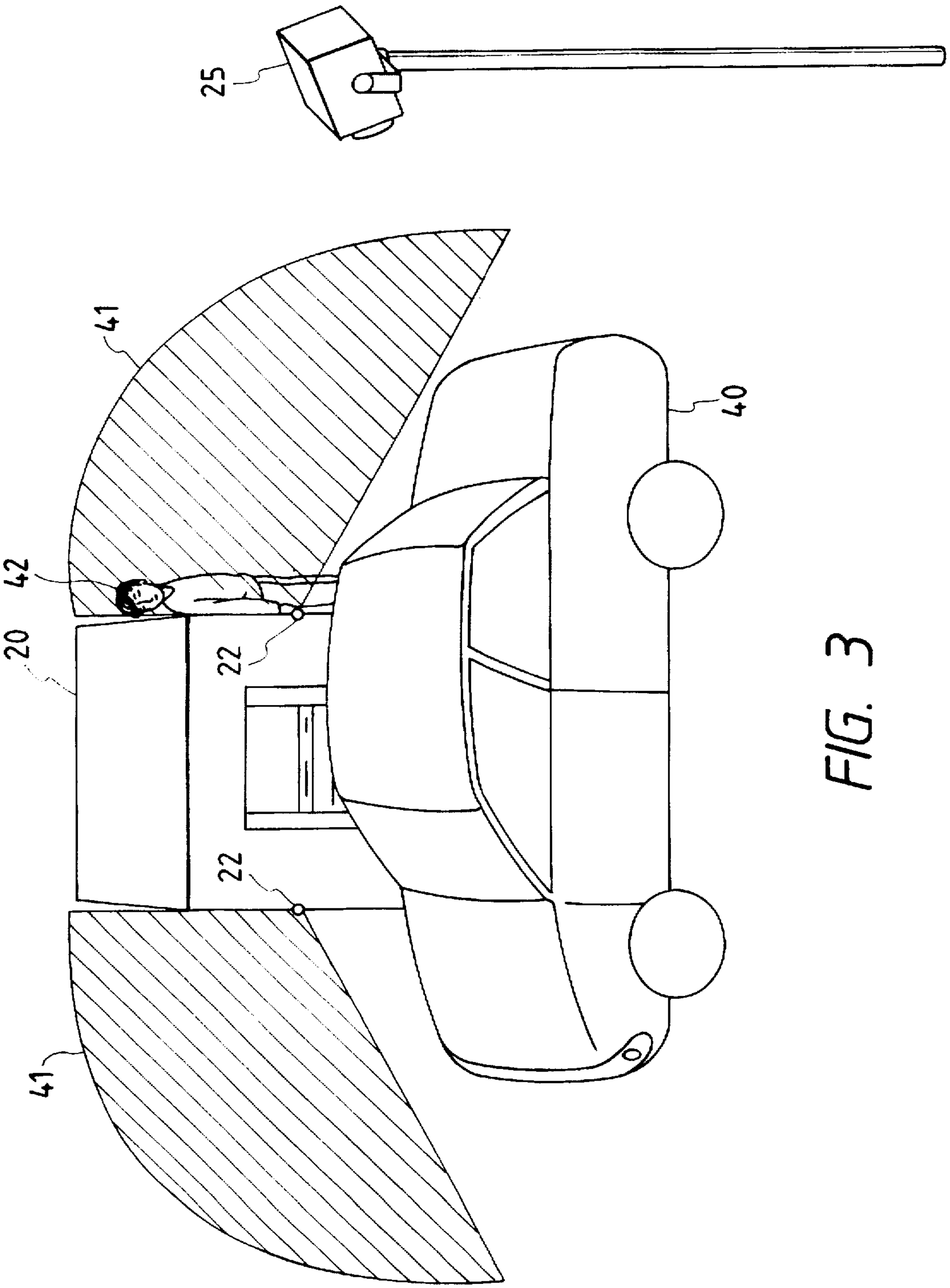
FIG. 3 is a schematic view showing a range covered by an anomaly detecting means of FIG. 1.

FIG. 1 is a block diagram showing the automatic teller machine of this invention; FIG. 2 shows the configuration of the machine; FIG. 3 shows the overall view of the equipment. As shown in FIG. 1 and 2, a display operation means 2 guides the user through transactions and displays information on the transaction being conducted and by which the user enter information necessary for the transaction. A voice output means 3 is an aid for the display operation means 2. Means for handling the transaction media include a bank note handling means 4, a coin handling means 5, a bankbook handling means 6, and a card and account slip handling means 7. These medium handling means each incorporate a means for accommodating media to be dispensed.

Further, there are provided a halt request means 10 for requesting suspension of the transaction at an arbitrary time during the course of transaction and a transaction recording means 8 for recording information on the transaction. A control means 12 controls all these means.

In addition to the ordinary handling of each medium, the control means 12, when the halt request means 10 makes a halt request, records on the transaction recording means the transaction information entered up to that point and the transaction steps carried out up to the halt request and puts the release of undistributed transaction media on hold. The control means 12 then informs the user of the resumption of the transaction by the operation guide means, resumes the transaction processing based on the resumption procedure beginning with the point at which the halt request was issued and control each transaction medium handling means to deal out the associated transaction media.

The above configuration is explained in further detail.

The display operation means 2 has a display device that displays input keys and operation guides and a touch panel. The voice output means 3 outputs voice operation guides.

A bank note handling means 4, in a transaction involving reception of cash, opens the cover of a bank note inlet/outlet opening 13, waits for the user to put bank notes in it, checks them for authenticity, and counts and stores them in the internal storage section. In a transaction involving payment of cash, the bank note handling means 4 counts and picks up a required number of bank notes from the storage section, transfers them to the bank note inlet/outlet opening 13 and then opens the cover of the bank note inlet/outlet opening 13 for the user to take the paid-out bank notes.

The coin handling means 5 performs cash receiving and paying processing, as with the bank note handling means 4. The bankbook handling means 6 prints the transaction records on the bank book which the user inserted from a bankbook inlet/outlet opening 15 and then puts a part of the book out of the machine from the bankbook inlet/outlet opening 15 so that the user can pull it out. The card and account slip handling means 7 reads an account number from the transaction card the user inserted from a card and account slip inlet/outlet opening 16 and, after the transaction is completed, puts out of the card and account slip inlet/outlet opening 16 a part of the transaction card and the account slip recorded with the transactions made so that the user can pick them up.

A transaction recording means 8 records all the transactions made by the automatic teller machine 1 so that the installer of the automatic teller machine 1 can check the transactions later. When a transaction halt request is made by the halt request means 10, the transaction recording means 8 stores the information entered by the user through the display operation means 2, information required for the transaction and retrieved from other sources, and to what step the transaction processing has gone.

A surroundings monitoring means 25 shown in FIG. 3 is a camera installed at a position that offers a good view of the surroundings of the automatic teller machine 1. A surrounding situation display means 9 is a monitor located at a position easily seen by the user during transactions. When the machine is occupied, the image captured by the surroundings monitoring means 25 is displayed by the surrounding situation display means 9.

The halt request means 10 is a button key which the user presses to request a suspension of transaction to the control means 12.

The automatic teller machine communicates with a center 51 through a communication means 11 to check the identification of the user and perform transaction processing such as updating of the balance of the account.

The automatic teller machine control means 12 controls various means in the automatic teller machine 1 and in a security system 26.

An automatic teller machine housing 20 for accommodating the automatic teller machine 1 protects the automatic teller machine 1 against rain and dust and prevents theft of the machine.

A customer sensing means 21 checks whether or not there is any person or car in front of the automatic teller machine 1.

This sensor may be constructed of an infrared emitting section and an infrared receiving section to determine the depth of a front space from the intensity and position of the infrared beam reflected from an object. It may also consist of a sonic wave emitting section and a sonic wave receiving section to determine the depth of the front space from a time difference between the transmission and reception of the sonic wave reflected from an object. The depth of the front space 1 when there is no human or car in front of the machine is stored in memory as a normal depth. When the depth is shallower than the normal depth, it is decided that there is a user. When the depth representing the presence of a user returns to the normal depth, it is decided that the user has left the machine.

An anomaly detection means 22 detects when an mobile object other than the user currently engaged in the transaction comes near the automatic teller machine 1. The area covered by the anomaly detection means 22 is shown in FIG. 3. In the figure are illustrated a car 40 in which the user conducting transactions stays, a mobile object detection range 41 and a third person 42 sneaking up on the machine. The anomaly detection means 22 checks the depth of a surrounding space by searching on a plane at a height of the human waist in a direction that is hard for the user to see. If there is any change over time in the space depth in the same direction, the anomaly detection means 22 decides that there is a mobile object. At this time, the depth is determined in the similar manner to that used by the customer sensing means 21. When a mobile object is detected, the voice output means 3 and the display operation means 2 alert the user that a mobile object is approaching. Although the user can know the situation of the surroundings from the surrounding situation display means 9, the anomaly detection means 22 alerts the user to an approaching third person even when he or she is engaged in the transaction, unaware of the surroundings.

When the customer sensing means 21 detects a user during the business hours, it opens a housing door 24 and an automatic teller machine moving means 23 moves the automatic teller machine 1 forward to project the operation panel from the opening. When there is no user, the automatic teller machine moving means 23 retracts the automatic teller machine 1 backward and closes the housing door 24.

Figure 4:
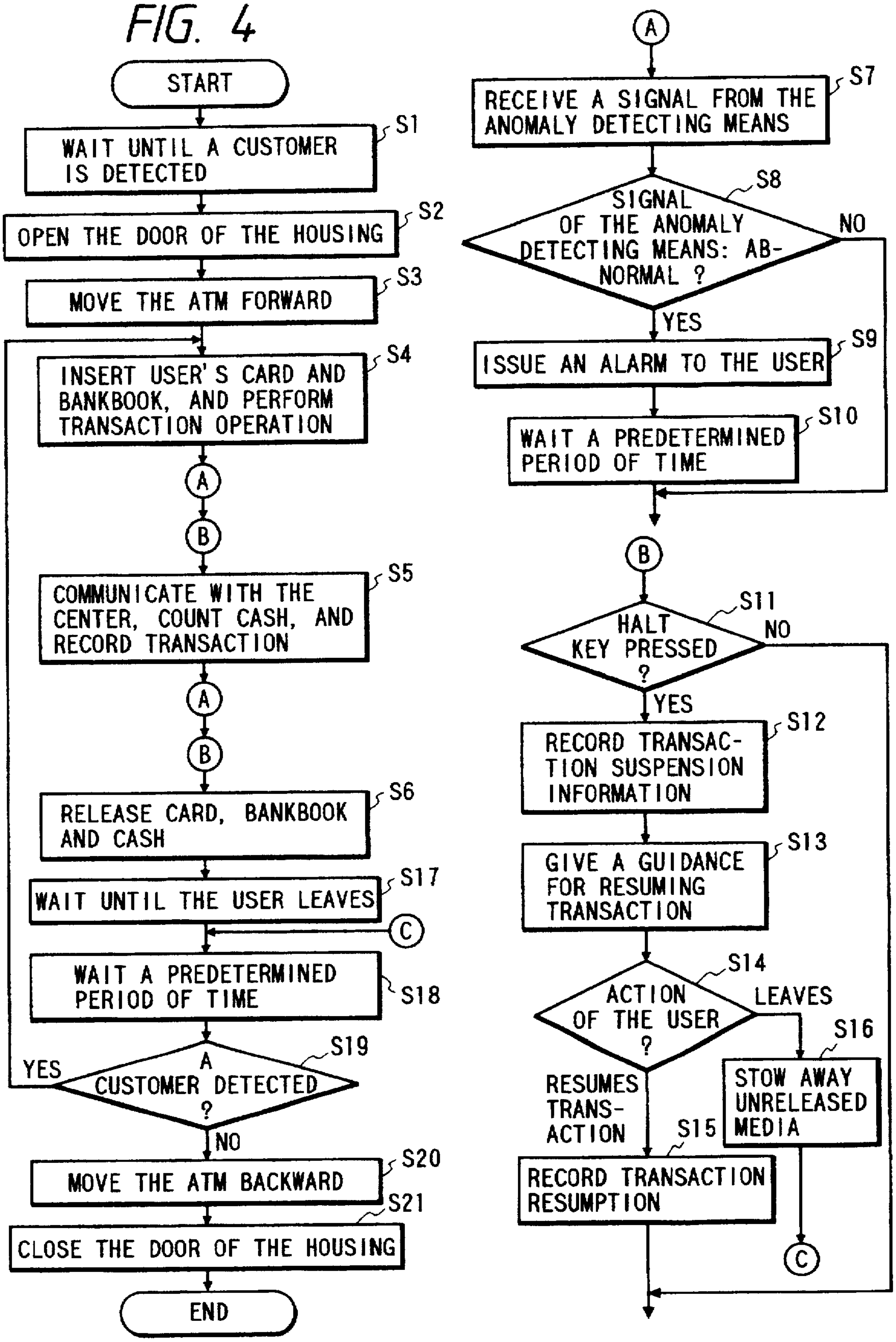
FIG. 4 is a flow chart showing the flow of control performed by the embodiment of FIG. 1.

Next, the flow of control performed by this embodiment during the course of a transaction involving the dispensing of cash is explained by referring to the flow chart of FIG. 4. First, the control program waits for the customer sensing means 21 to detect a user (S1). When the customer sensing means 21 detects a user, the housing door 24 is opened (S2) and the automatic teller machine moving means 23 moves the automatic teller machine 1 forward (S3). The user puts his or her transaction card into the card and account slip inlet/outlet opening 16 and the bankbook into the bankbook inlet/outlet opening 15, and then enters his or her personal identification number and the amount of money to be drawn out (S4). Then, the card and account slip handling means reads the account number and the communication means 11 communicates with the center 51 to check the identification of the user and update the balance of the account. The bank note handling means 4 and the coin handling means 5 pick up cash from the storage section, counts and transfers the cash to the bank note inlet/outlet opening 13 and the coin inlet/outlet opening 14. The bankbook handling means 6 prints the transaction record on the bankbook and the transaction recording means 8 records the transactions made (S5).

After this, the machine deals out the user's card and account slip from the card and account slip inlet/outlet opening 16, the bankbook from the bankbook inlet/outlet opening 15, and cash from the bank note inlet/outlet opening 13 and the coin inlet/outlet opening 14 (S6). After the transaction is processed from S4 to S6, the control means 12 waits until the customer sensing means 21 detects the user leaving the machine (S17). While the transaction processing from S4 to S6, security processing is also performed. That is, the control means 12 receives from the anomaly detection means 22 a signal indicating whether there is any mobile object around the automatic teller machine 1 (S7). If the signal represents the presence of a mobile object, i.e., when an abnormal situation exists in which a third person may be approaching (S8), the machine alarms the user engaged in transactions that an abnormal situation exists (S9). The machine waits a predetermined time counting an internal timer incorporated in the control means 12 so that the user can check the surrounding situation display means 9 to see whether there is really a third person or simply a passerby (S10). When the user finds it unsafe to let the transaction media be released now, he presses the halt request means 10.

Then the control means 12 checks if the halt request means 10 is depressed (S11). When the halt request means 10 is pressed when the transaction information of the user is being entered during the step S4, the control means 12 erases the entered information from the display and records in the transaction recording means 8 the entered information and information representing at which stage in the transaction processing the halt request was issued. When the halt request means 10 is pressed during the internal processing at the step S5, the control means 12 does not release the media at S6 after the internal processing is completed, and then records in the transaction recording means 8 at which stage in the transaction processing the halt request was made. When the halt request means 10 is pressed during the release of media at the step S6, the control means 12 does not discharge those transaction media which have not yet been released, and records in the transaction recording means 8 at which stage in the transaction processing the halt request was made (S12). Then the control means 12 controls the display operation means 2 and the voice output means 3 to tell the user how to resume the transaction, for example, to enter his or her personal identification number (S13).

When the user wishes to resume the transaction after he is sure that the third person has left, the user follows the resumption procedure guided by the step S13 (S14). Then the transaction recording means 8 records that the transaction has restarted (S15). And the control means 12 resumes, based on the information recorded in the transaction recording means 8, the suspended transaction from the point at which the halt request was issued. If at step S14 the user feels insecure being in front of the automatic teller machine 1 and leaves there, the transaction medium handling means 4, 5, 6, 7 transfer the undistributed media to the unreleased medium storage means (not shown) (S16). The transaction media stored in the unreleased medium storage means are released only when the user who have left the machine comes again, selects from transaction menu an unreleased medium return procedure or other associated transactions, and identifies himself by the transaction card and personal identification number. The control means 12 records the resumption of the transaction in the transaction recording means 8. The entered information and the transaction processing stage information produced when the halt request was issued, both recorded in the transaction recording means 8, is transferred to the memory means in the center 51 so that the transaction can be resumed later on other automatic teller machines that can communicate with the center 51.

The drawing is abbreviated, but the security processing steps S7 to S8 are repeated many times during the transaction form S4 to S6. For example, before every event include steps S7 to S8. The events mean card insertion, bankbook insertion, key touching, and so on. After the user has left, the machine waits a predetermined time for the next user (S18). Then, when the customer sensing means 21 detects a user, the control means 12 repeats the processing starting with S4 (S19). If at S19 no other user comes to the machine, the automatic teller machine moving means 23 moves the automatic teller machine 1 rearward (S20) and the housing door 24 is closed (S21) . The above steps S1–S21 are repeated during the business hours.

This embodiment offers satisfactory security. Because the user can suspend his transaction at any time and later resume his transaction from the stage at which the transaction was suspended, if the user decides he is in an unsafe situation when the transaction media are about to be released, he can stop the release of the transaction media and later, when the undesired situation is eliminated, receive the transaction media. If the user suspends his transaction while entering information necessary for the transaction, there is no need to re-enter the information already entered up to the point when the suspension request was issued. Further, because the surrounding situation display means allows the user to easily grasp what is happening around him during the transaction, the user feels secured. The machine also alerts the user to an approaching third person, so that the user can easily become aware of the third person, thus assuring increased safety.

Figure 5:
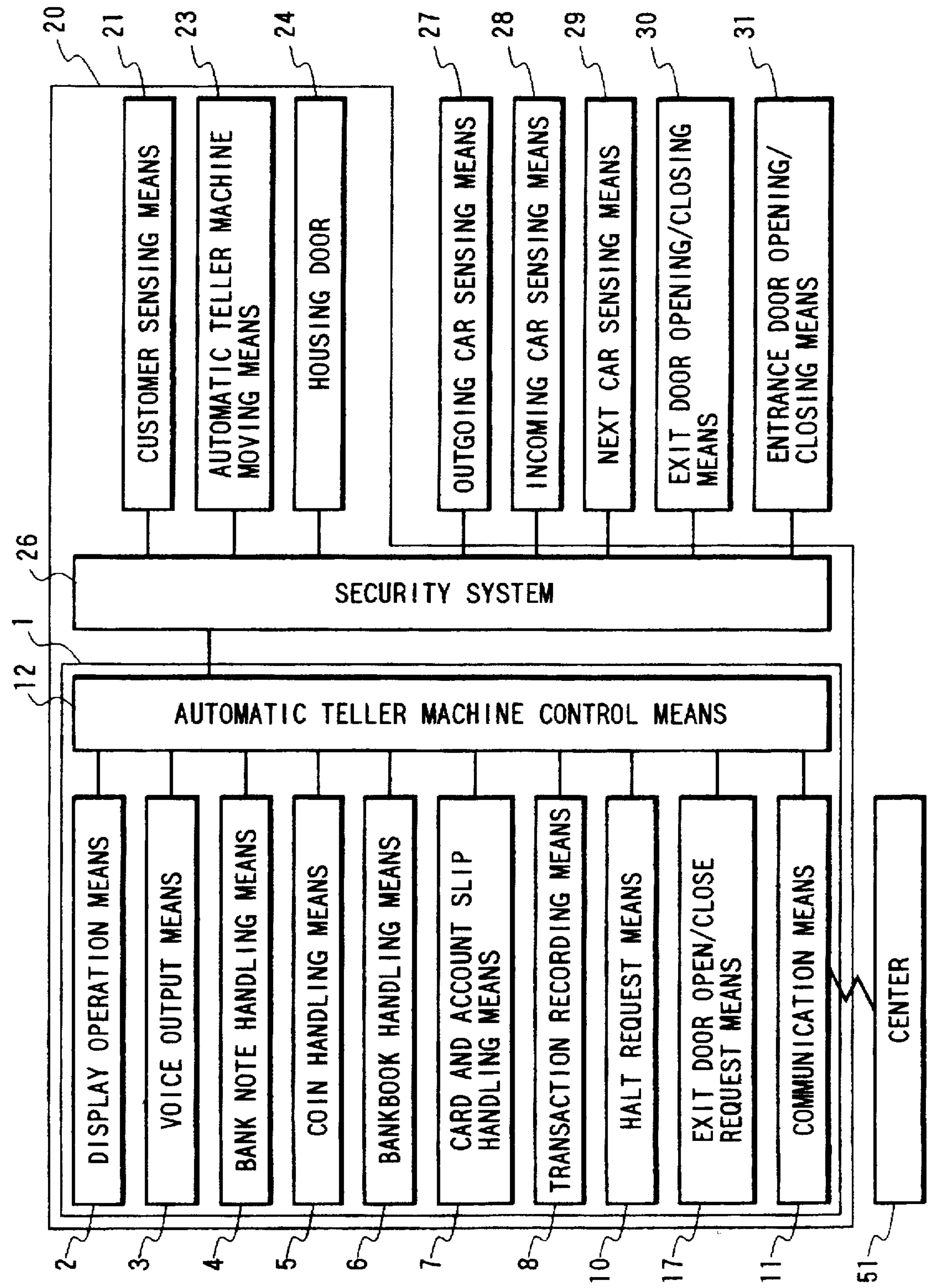
FIG. 5 is a block diagram of a second embodiment of this invention.

Another embodiment of this invention will be explained by referring to FIG. 5 and FIG. 6. The point in which this embodiment differs from the first embodiment shown in FIG. 1 to 4 is that instead of using the anomaly detection means 22 and the surroundings monitoring means 25, a fence is used to enclose the user's car during transaction to prevent a third person from entering the transaction area, thus assuring security.

Figure 6:
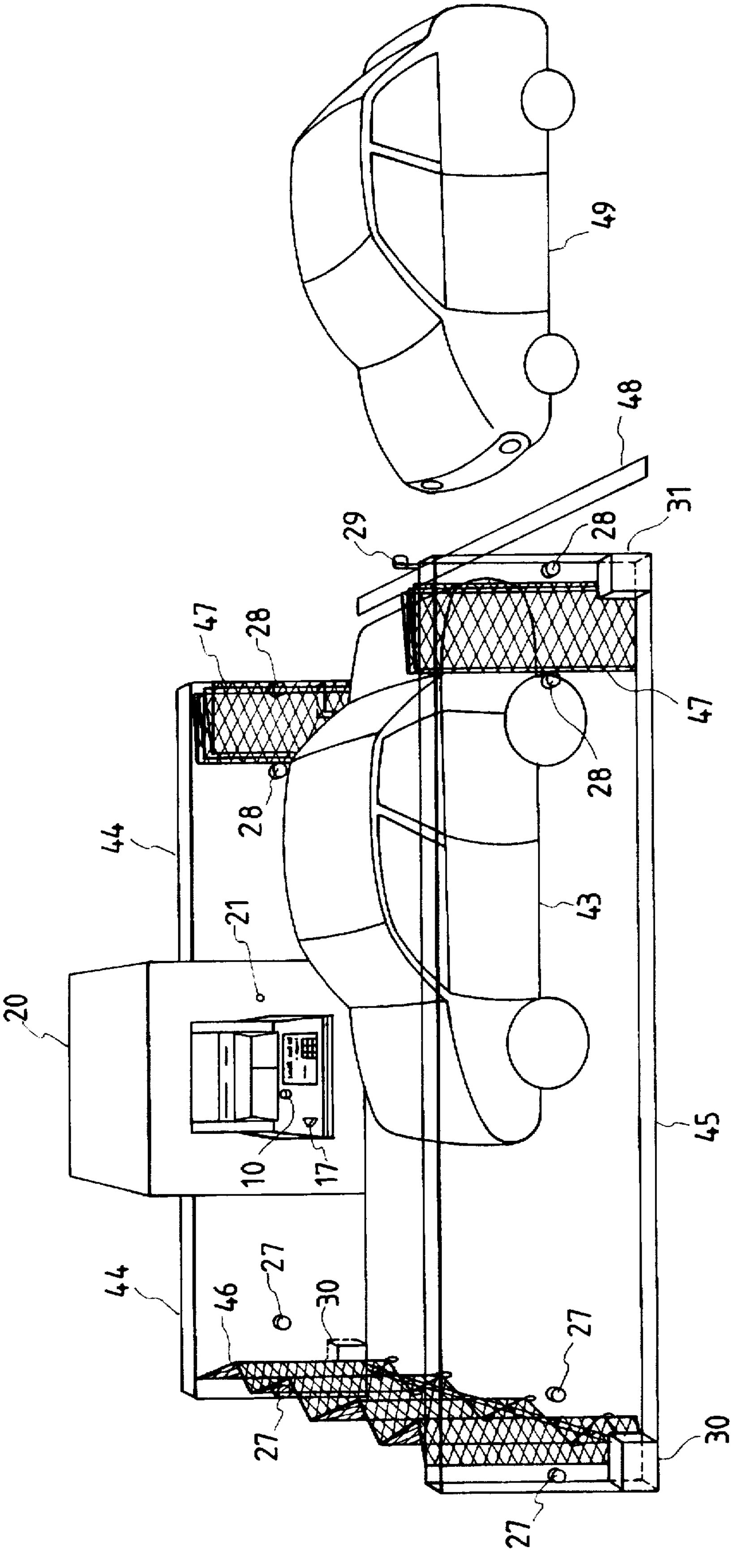
FIG. 6 is a schematic perspective view showing a configuration of the embodiment of FIG. 5.

As shown in FIG. 6, fences or walls 44, 45, high enough to prevent third persons from easily climbing over them and entering the transaction area, are made of a transparent reinforced glass to mitigate a sense of being isolated in a small closed space and allow the user to have the outside view from inside. An exit door 46 and an entrance door 47 are high enough so that average humans cannot easily get over them and are made of steel grid to allow the user to see the outside conditions. The space enclosed by the fences 44, 45, the exit door 46 and the entrance door 47 is referred to as a transaction space.

An exit door opening/closing means 30 and an entrance door opening/closing means 31 pull from both sides the exit door 46 and the entrance door 47 by wires passing under these doors to fold them open or unfold them closed, respectively. An outgoing car sensing means 27 and an incoming car sensing means 28 each comprise two pairs of opposing elements, with two elements in each pair disposed on the inner and outer side of the exit door 46 and the entrance door 47, respectively. One of the opposing elements in each pair is a light emitting element and the other a light receiving element. These means detect the passing cars at the exit and the entrance. When the doors are opened and cars pass the exit or the entrance, beams of light, such as infrared rays, transmitted from the light emitting element to the light receiving element, are blocked by the passing cars. When, after the entrance door 47 is opened and the beam is blocked temporarily, the beam is received again by the light receiving element and the customer sensing means 21 detects a user's car, it is decided that the car has passed the entrance and entered into the transaction space. When, after the exit door 46 is opened and the beam is interrupted temporarily, the beam is received again by the light receiving element and the customer sensing means 21 detects the user's car moving away, it is decided that the car has passed the exit and got out of the transaction space. Before closing the door, it is checked that a car has completely passed. This system can detect not only a passing car as it is intended to do as a drive-through system but also whatever blocks the beam as it passes. Thus, it is possible to detect a user coming on foot or on bike, and the user can perform transactions in the same way as when he uses an automobile.

An exit door open/close request means 17 is a button key for a user in his car in the transaction space to demand the opening or closing of the exit door 46. Denoted 43 is a car driven by a user who is going to make transactions. A stop line for the next car 48 is a marker where the next car shall wait when the preceding car is in the transaction space. Reference number 49 represents an automobile in which the next user waits for his turn. A next car sensing means 29 checks if a car is present at the position of the next car stop line. The presence or absence of a car is detected in the same way as with the customer sensing means 21. Even when the user comes on foot, he or she is detected when he stands in front of the next car sensing means 29.

To prevent a third person from approaching the user during transaction for assuring security, the control means 12 performs the following control on the exit door opening/closing means 30 and the entrance door opening/closing means 31 so that only one car can occupy the transaction space at all times. First, under the condition that the customer sensing means 21 has not yet found a user, the control means 12 stands by with the exit door 46 and the entrance door 47 closed. Then, when the next car sensing means 29 detects a car at the position of the next car stop line 48, the control means 12 causes the entrance door opening/closing means 31 to open the entrance door 47. When the incoming car sensing means 28 detects that the car has passed and entered into the transaction space, the control means 12 causes the entrance door opening/closing means 31 to close the entrance door 47. At this time, the customer sensing means 21 detects the car. While the customer sensing means 21 is in the car detecting state, the entrance door 47 is kept closed even when the next car sensing means 29 senses the next car.

When the user demands the opening of the exit door by the exit door open/close request means 17, or when a predetermined period of time long enough for the user to pick up and stow away the transaction media elapses after the transaction is completed, the control means 12 causes the exit door opening/closing means 30 to open the exit door 46. After the outgoing car sensing means 27 has detected that the car has gone out of the transaction space, the exit door 46 is closed. Now, the control procedure returns to the first step and repeats itself.

With this embodiment, because the user conducts transactions in a closed space not easily accessible to a third person, the user is assured of security of transaction. Although this embodiment uses glass and grid for the fences and doors, any other materials that will block easy access to a third person and allow the user to have the outside view from inside can be employed. It is also possible to use a wall of a building instead of a fence. To ensure that no third person is hiding in the transaction space, it is desired that the transaction space be so shaped that every corner can be easily seen. If there is any dead ground that cannot be clearly seen, the user's security is ensured by using the anomaly detection means 22 and the surroundings monitoring means 25, both explained in the preceding embodiment.

Figure 7:
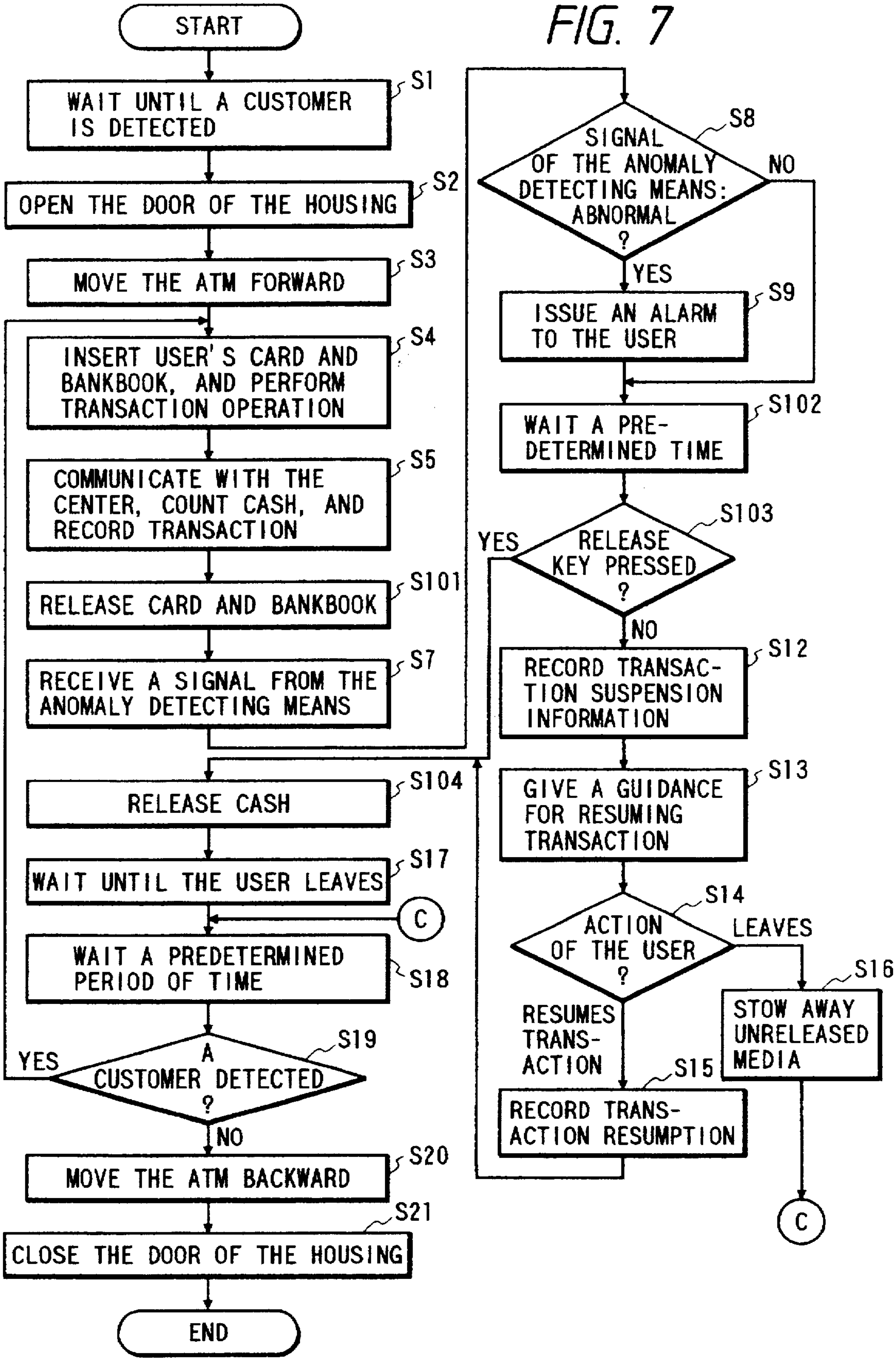
FIG. 7 is a flow chart showing the flow of control performed by the third embodiment of this invention.

By referring to a flow chart of FIG. 7, the control flow of the automatic teller machine and its security system of the another embodiment, third embodiment will be described. This embodiment has a release request means 10' instead of the halt request means 10 shown in the first embodiment of FIG. 1. This embodiment is also characterized in that cash can be made to be released only after checking the surroundings. Only the difference from the control flow of FIG. 4 is explained. Steps S1 to S5 are the same as those of FIG. 4. In this embodiment, after the card and bankbook are released after the step S5 (S101), the control means 12 receives a signal from the anomaly detection means 22 (S7) and, if any abnormal condition is found to exist (S8), issues an alarm (S9). The control means 12 does not release cash and waits a predetermined time. If the user checks his surroundings for safety and presses the release demand key, the control 12 breaks off the waiting (S102). If the release demand key is pressed (S103), the control means 12 releases cash (S104) and stands by until the user leaves (S17). If the release demand key is not pressed for a predetermined duration, the control means 12 decides that the user has suspended his transaction and performs the steps S12–S16 as in FIG. 4. Subsequent steps are similar to those of FIG. 4. In this embodiment, during the time after the user picks up his card and bankbook until he puts them in his bag, the covers of the bank note inlet/outlet opening 14 and coin inlet/outlet opening 15 do not open, preventing the cash from being exposed. This offers an increased level of safety.

Although the above embodiment provides the release demanding means only to cash, the same means may also be provided to other transaction media such as transaction card and bankbook. In that case, the control means 12 waits for the user to demand release for each transaction medium. In the first and second embodiment, the release request means 10' may be provided in place of the halt request means 10.

The surroundings monitoring means 25 may not be provided one for each automatic teller machine but the image from the camera may be shared by a plurality of automatic teller machines.

In addition to security, this invention offers convenience to the user in ordinary transactions. For example, when the printing of the bankbook takes an unexpectedly long time because of a large amount of recordings, the user can suspend the processing by the halt demand means and in the future resume the suspended processing when he can spare the time. In the automatic teller machines that perform transactions requiring a variety of personal information, such as opening of an account and processing applications, when an input item is encountered which the user is not sure of and needs to check, he can suspend the processing by the halt request means 10 and, after checking with the item, resume the processing some other day. Thus, the means for requesting the suspension of medium release and for demanding release may be attached to an automatic teller machine installed in the office or a booth. In that case, the automatic teller machine housing 20, automatic teller machine moving means 23 and housing door 24, and the steps S2, S3, S20 and S21 shown in FIG. 4 and FIG. 7 are not necessary. In the automatic teller machines installed in a relatively safe regions or at positions where the user can easily see the surrounding situation, the anomaly detection means 22 and the surrounding situation display means 9 may be omitted. In that case, the steps S7, S8, S9 and S10 shown in FIG. 4 and 7 are eliminated.

If the automatic teller machine's form is accessible for the user, it is not necessary to move forward the automatic teller machine. In this case, automatic teller machine moving means 23 and the steps S3 and S20 can be omitted. While the above embodiment concerns an example case of an automatic teller machine that takes in information and inputs and outputs transaction media, the above description also applies to automatic teller machines that handle only information not transaction media and further to those that do not have an information input means and perform only the inputting and outputting of transaction media.

To prevent tampering with the automatic teller machine, the entrance door 47 may be opened only to the users authorized by the installer of the automatic teller machine. In that case, the automatic teller machine control means 12 causes the entrance door opening/closing means 31 to open the entrance door 47 only when a card reader installed outside the entrance door 47 reads the card and identifies the user as an authorized person.

The customer sensing means 21, the anomaly detection means 22, the outgoing car sensing means 27, the incoming car sensing means 28 and the next car sensing means 29 need only to distinguish between the presence and absence of an object in a certain area. They may use a pyroelectric sensor; or they may detect presence and absence as well as movement of humans and automobiles based on a differential image with respect to a reference image having no humans or automobiles. When an image is used, the image from the surroundings monitoring means 25 may be used.

As explained above, this invention offers improved security because the user can suspend, according to the conditions of surroundings, the transaction at any time including the times when transaction information is being entered or transaction media are being released and, after the circumstance turns safe, resume the suspended transaction.

Further, the automatic teller machine of this invention can check the surrounding circumstances easily during transaction to detect an approaching third person and inform it to the user, improving the level of security. The user can feel more secure if the transaction is made in a space that is inaccessible to a third person.

What is claimed is:

1. An automatic teller machine comprising:

transaction medium handling means for handling transaction media; and halt requesting means for requesting suspension of processing of the transaction media;

wherein the transaction medium handling means is responsive to the halt requesting means for suspending release of the transaction media.

2. An automatic teller machine according to claim 1, comprising:

input means for entering transaction information;

transaction recording means for recording the transaction information entered from the input means and for recording a current transaction processing stage of the transaction medium handling means when a transaction suspension is requested by the halt requesting means; and an unreleased medium storing means for storing unreleased transaction media handled by the transaction medium handling means when the suspension of transaction is requested by the halt requesting means.

3. An automatic teller machine according to claim 2, further comprising an operation guide means for guiding a procedure of resuming the suspended transaction when suspension of the transaction is requested by the halt requesting means, wherein the transaction media are at least one of cash, a bankbook and a card, and, when suspension of the transaction is requested by the halt requesting means, the suspended transaction processing is resumed, according to the resumption procedure of the operation guide means, from the transaction processing stage recorded in the transaction recording means by using the transaction information recorded in the transaction recording means to release the transaction media stored in the unreleased medium storage means.

4. An automatic teller machine according to claim 1, further comprising an operation guide means for guiding a transaction resumption procedure when suspension of a transaction is requested by the halt requesting means, wherein, based on the transaction resumption procedure, the suspended transaction processing is resumed.

5. An automatic teller machine according to claim 1, further comprising display means for displaying transaction information, the display means being responsive to the halt requesting means requesting suspension of a transaction for erasing the transaction information displayed on the display means.

6. An automatic teller machine according to claim 1, further comprising an image capturing means for capturing images of surrounding area and a surrounding area display means for displaying to a user images of the surrounding area captured by the image capturing means.

7. An automatic teller machine according to claim 1, further comprising a security system having an anomaly detecting means for detecting an approaching mobile object other than a user engaged in the transaction, the security system being responsive to the anomaly detecting means detecting the approaching mobile object for issuing an alarm to the user.

8. An automatic teller machine according to claim 1, further comprising a security system including:

an enclosing structure for enclosing an automobile of a user and adapted to prevent another person or automobile from entering the enclosed space when the enclosed structure is closed; an entrance and an exit provided in the enclosing structure to allow the passage of automobiles; and an opening/closing means for controlling the entrance and exit so that only one automobile is admitted into the enclosed space.

9. An automatic teller machine comprising:

operation guide means for guiding operations of a transaction;

transaction medium handling means for handling transaction media;

halt requesting means for requesting suspension of a transaction during a period from start to end of the transaction, the transaction medium handling means being responsive to the halt requesting means for suspending handling of the transaction;

transaction recording means for recording a transaction processing stage of the transaction medium handling means arrived at when suspension of the transaction was requested by the halt requesting means; and an unreleased medium storing means for storing unreleased media handled by the transaction medium handling means when the transaction suspension is requested;

wherein the operation guide means guides a procedure of resuming the suspended transaction to release the transaction media stored in the unreleased medium storing means.

10. An automatic teller machine comprising:

input means for entering information necessary for a transaction;

transaction medium handling means for handling transaction media; and release requesting means for requesting release of the transaction media;

wherein the transaction medium handling means is responsive to the request for release of the transaction media by the release requesting means for releasing the associated transaction media.

11. An automatic teller machine according to claim 10, further comprising transaction recording means for recording transaction information entered by the input means and for recording a transaction processing stage of the transaction medium handling means; and an unreleased medium storing means for storing unreleased transaction media until the release of the media is requested by the release requesting means.

12. An automatic teller machine according to claim 10, further comprising:

a transaction recording means for recording transaction information including information entered by the input means up to the release of the transaction media; and an unreleased medium storing means for storing unreleased transaction media;

wherein the transaction media are at least one of cash, a bankbook and a card, and, when the release of the transaction media is requested by the release requesting means, the transaction media stored in the unreleased medium storing means are released.

13. An automatic teller machine according to claim 10, further comprising an image capturing means for capturing image of a surrounding area and a surrounding area display means for displaying to a user images of the surrounding situation captured by the image capturing means.

14. An automatic teller machine according to claim 10, further comprising a security system having an anomaly detecting means for detecting an approaching mobile object other than a user engaged in the transaction, the security system being responsive to the anomaly detecting means detecting the approaching mobile object for issuing an alarm to the user.

15. An automatic teller machine according to claim 10, further comprising a security system including:

an enclosing structure for enclosing an automobile of a user and adapted to prevent another person or automobile from entering the enclosed space when the enclosed structure is closed; an entrance and an exit provided in the enclosing structure to allow the passage or automobiles; and an opening/closing means for controlling the entrance and exit so that only one automobile is admitted into the enclosed space.

* * * * *